(12) United States Patent
Carre

(10) Patent No.: US 10,483,575 B2
(45) Date of Patent: Nov. 19, 2019

(54) FUEL CELL DEVICE

(71) Applicant: Robert Bosch GmbH, Stuttgart (DE)

(72) Inventor: Maxime Carre, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 650 days.

(21) Appl. No.: 14/810,790

(22) Filed: Jul. 28, 2015

(65) Prior Publication Data

US 2016/0036078 A1 Feb. 4, 2016

(30) Foreign Application Priority Data

Jul. 29, 2014 (DE) .................... 10 2014 214 848

(51) Int. Cl.

| H01M 8/0612 | (2016.01) |
|---|---|
| H01M 8/06 | (2016.01) |
| H01M 8/0662 | (2016.01) |
| H01M 8/04007 | (2016.01) |
| H01M 8/04089 | (2016.01) |
| H01M 8/04082 | (2016.01) |
| H01M 8/0438 | (2016.01) |
| H01M 8/04746 | (2016.01) |

(52) U.S. Cl.
CPC ..... *H01M 8/0618* (2013.01); *H01M 8/04067* (2013.01); *H01M 8/04097* (2013.01); *H01M 8/04201* (2013.01); *H01M 8/0631* (2013.01); *H01M 8/0675* (2013.01); *H01M 8/0693* (2013.01); *H01M 8/04395* (2013.01); *H01M 8/04776* (2013.01)

(58) Field of Classification Search
CPC .............................................. H01M 8/04067
See application file for complete search history.

(56) References Cited

U.S. PATENT DOCUMENTS

| 5,079,103 A * | 1/1992 | Schramm ............ H01M 8/0662 429/411 |
| 2008/0102328 A1 * | 5/2008 | Saunders .................. C01B 3/26 429/410 |

FOREIGN PATENT DOCUMENTS

| DE | 102009006983 A1 | 8/2009 |
| DE | 102011107669 A1 | 1/2013 |
| DE | 102011088120 A1 | 6/2013 |

* cited by examiner

*Primary Examiner* — Daniel S Gatewood
(74) *Attorney, Agent, or Firm* — Michael Best & Friedrich LLP

(57) ABSTRACT

The invention is based on a fuel cell device which is provided to be operated with a natural gas, having a fuel cell unit (12) and an anode gas processor (14) arranged upstream of the fuel cell unit (12), which anode gas processor is provided to prepare the natural gas for use in the fuel cell unit (12) and which comprises a desulfurization unit (18), which is provided to desulfurize the natural gas, an oxidation unit (20), which is provided to perform partial oxidation, and a reformer unit (22), which is provided to produce at least one fuel gas.

It is proposed that the fuel cell device comprise a recirculation unit (16), which is provided to supply at least a proportion of an anode waste gas from the fuel cell unit (12) to the fuel cell device (10).

17 Claims, 2 Drawing Sheets

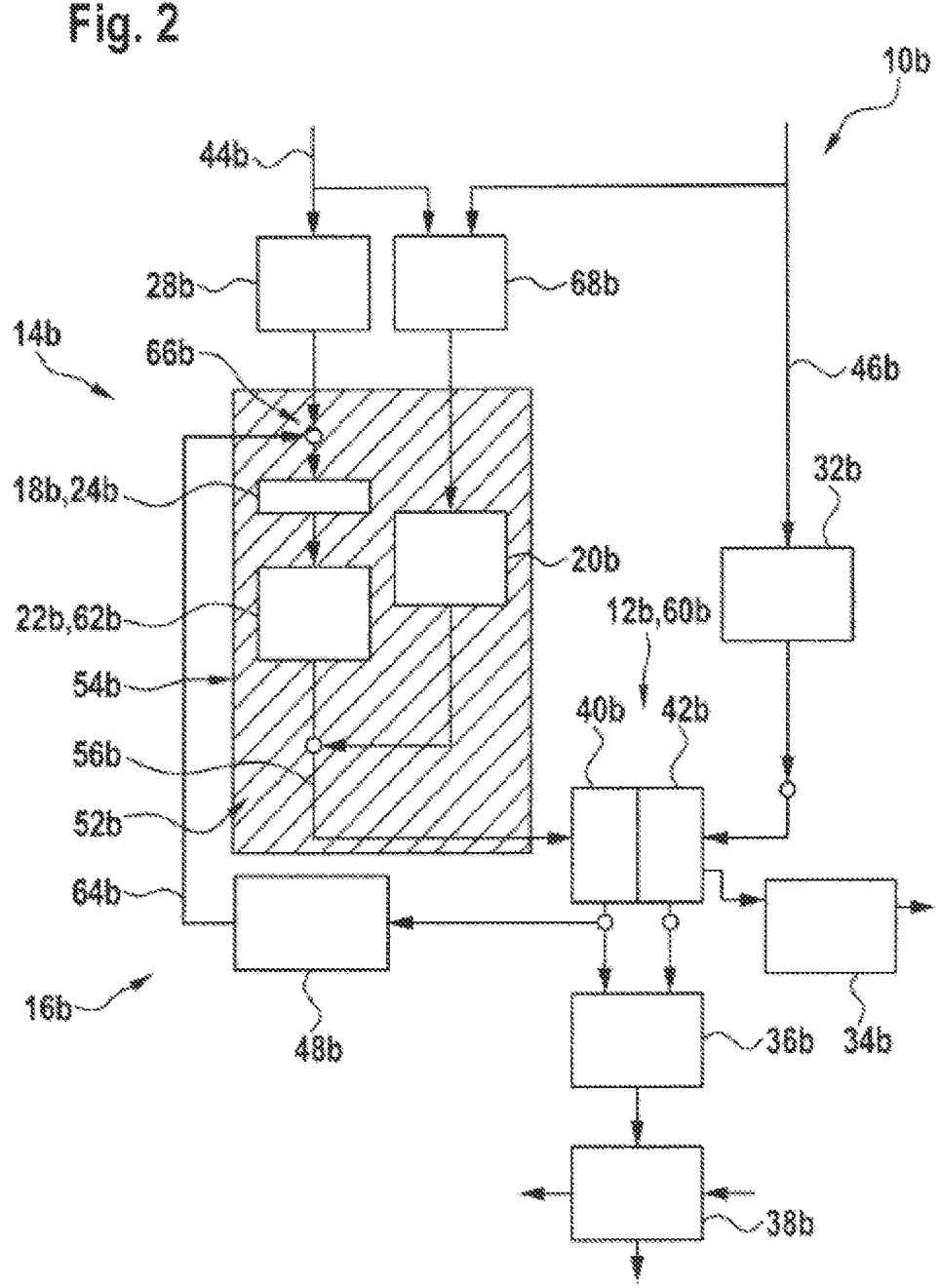

FUEL CELL DEVICE

BACKGROUND OF THE INVENTION

The invention relates to a fuel cell device to be operated with a natural gas, having a fuel cell unit and an anode gas processor upstream of the fuel cell unit, which anode gas processor is provided to prepare the natural gas for use in the fuel cell unit and which comprises a desulfurization unit provided to desulfurize the natural gas, an oxidation unit, which is provided to perform partial oxidation, and a reformer unit, which is provided to produce at least one fuel gas.

A fuel cell device has already been proposed which is provided to be operated with a natural gas, and which fuel cell device comprises a fuel cell unit and an anode gas processor arranged upstream of the fuel cell unit, which anode gas processor is provided to prepare the natural gas for use in the fuel cell unit. The anode gas processor comprises a desulfurization unit, an oxidation unit and a reformer unit.

SUMMARY OF THE INVENTION

The invention is based on a fuel cell device which is provided to be operated with a natural gas, having a fuel cell unit and an anode gas processor arranged upstream of the fuel cell unit, which anode gas processor is provided to prepare the natural gas for use in the fuel cell unit and which comprises a desulfurization unit, which is provided to desulfurize the natural gas, an oxidation unit, which is provided to perform partial oxidation, and a reformer unit, which is provided to produce at least one fuel gas.

It is proposed that the fuel cell device comprise a recirculation unit, which is provided to supply at least a proportion of an anode waste gas from the fuel cell unit to the anode gas processor.

A "fuel cell device" should be understood in this context in particular to mean a device for stationary and/or mobile production in particular of electrical and/or thermal energy using at least one fuel cell unit. A "natural gas" should be understood in this context in particular to mean a gas and/or a gas mixture, in particular a natural gas mixture, which preferably comprises at least one alkane, in particular methane, ethane, propane and/or butane. In addition, the natural gas may comprise further constituents, such as in particular carbon dioxide and/or nitrogen and/or oxygen and/or sulfur compounds. A "fuel cell unit" should be understood in this context in particular to mean a unit with at least one fuel cell, which is provided to convert at least one chemical reaction energy of at least one, in particular continuously supplied, fuel gas, in particular hydrogen and/or carbon monoxide, and of at least one oxidizing agent, in particular oxygen, in particular into electrical energy. The at least one fuel cell preferably takes the form of a solid oxide fuel cell (SOFC). The at least one fuel cell unit preferably comprises a plurality of fuel cells, which are arranged in particular in a fuel cell stack. "Provided" should be understood in particular to mean specially programmed, designed and/or equipped. Where an item is provided for a specific function, this should in particular be understood to mean that the item fulfills and/or performs this specific function in at least one application state and/or operating state. An "anode gas processor" should be understood in this context in particular to mean a unit which is provided to prepare the natural gas prior to supply to an anode of the fuel cell unit for use in a reaction proceeding in the fuel cell unit. In particular, the anode gas processor is provided in particular to heat a natural gas and/or a fuel gas and/or a gas mixture containing fuel gas to a reaction temperature and/or to convert the natural gas into a fuel gas and/or a fuel gas mixture. The anode gas processor may in particular take the form of a structural unit. A "structural unit" should be understood in this context in particular to mean a pre-assemblable and/or preferably pre-assembled unit, which combines a plurality of subunits, in particular the desulfurization unit, the oxidation unit and the reformer unit, and/or components, for example fluid connections and/or sensors and/or heat exchangers, in such a way that they may preferably be introduced as a unit into an overall system, in particular into a fuel cell system and/or may be removed as a unit from the overall system. The subunits and/or components of the structural unit may in particular be connected together, in particular in a mechanically robust manner, by means of a common support structure. In this case, the support structure is in particular of a different configuration from pipes which are provided to convey fluid.

A "desulfurization unit" should be understood in this context in particular to mean a unit which is provided, preferably by at least one physical and/or chemical adsorption process and/or absorption process, to lower a proportion by volume and/or molar fraction of sulfur compounds in the natural gas in particular to below a specified limit value and preferably to remove them at least substantially from the natural gas. A "reformer unit" should be understood in this context in particular to mean a chemical engineering unit which is provided to convert at least one hydrocarbon-containing fuel, preferably a natural gas, by steam reforming with the addition of steam at least in part into a fuel gas, in particular hydrogen, and/or a gas mixture containing fuel gas. An "oxidation unit" should be understood in this context in particular to mean a unit which is provided to convert the natural gas in particular by means of thermal partial oxidation and/or catalytic partial oxidation with the addition of oxygen, in particular atmospheric oxygen, at least in part into a fuel gas, in particular hydrogen, and/or a gas mixture containing fuel gas. The oxidation unit makes it possible to obtain hydrogen, in particular if during a starting procedure of a fuel cell system too low a proportion of steam is available for the reformer unit. If a sufficient quantity of steam is present, steam reforming using the reformer unit has in particular a greater hydrogen yield than partial oxidation by means of the oxidation unit.

A "recirculation unit" should be understood in this context in particular to mean a connection unit which is provided to transport in particular liquid and/or gaseous substances and/or substance mixtures. In particular, the recirculation unit comprises at least one hollow line, for example at least one pipe and/or hose line. The recirculation unit is in particular provided to supply an in particular fixed percentage of a volumetric flow, in particular between 30% and 90%, of an in particular steam-containing and/or hydrogen-containing waste gas from the fuel cell unit, in particular an anode waste gas, to the input side of the anode gas processor. In this way, hydrogen required for the desulfurization of the natural gas may advantageously be supplied to the desulfurization unit and/or steam required for steam reforming may advantageously be supplied to the reformer unit.

Such a configuration makes it possible to provide a fuel cell device of the type in question with advantageous operating characteristics. In particular, by combining the desulfurization unit, the oxidation unit and the reformer unit to form the anode gas processor, the size of the fuel cell device and/or assembly effort may advantageously be reduced. In addition, the structure of a fuel cell system may advantageously be simplified, since the number of media feed lines required, in particular for supplying natural gas and/or ambient air, may advantageously be reduced. Moreover, hydrogen required for desulfurization of the natural gas and/or steam required for steam reforming may be supplied advantageously simply to the desulfurization unit or the reformer unit respectively by means of the recirculation unit.

It is additionally proposed for the desulfurization unit, the oxidation unit and the reformer unit to be connected together flow-wise in series. In this way, an advantageously simple and/or inexpensive structure of the anode gas processor may be achieved. In particular, the number of required fluid lines and/or the number of instances of fluid line branching may advantageously be reduced, so advantageously reducing complexity and/or susceptibility to faults.

In one preferred configuration of the invention, it is proposed that the desulfurization unit be arranged flow-wise upstream of the oxidation unit and the reformer unit be arranged flow-wise downstream of the oxidation unit. In this way, the functionality and/or efficiency of the fuel cell device may advantageously be increased.

If the anode gas processor comprises a mixing unit which is provided to mix a fluid leaving the desulfurization unit with ambient air, an atmospheric oxygen required for an oxidation process may be supplied advantageously simply in particular to the oxidation unit. A "mixing unit" should be understood in this context in particular to mean a unit with at least two fluid inlets and a fluid outlet, which unit is provided to achieve the intermixing of fluids which may be introduced through the at least two fluid inlets. The mixing unit preferably comprises one fluid inlet in each case for the fluid leaving the desulfurization unit and the ambient air. The mixing unit is preferably arranged flow-wise between the desulfurization unit and the oxidation unit.

It is moreover proposed that the fuel cell system have an ambient air metering unit, which is provided to regulate the supply of ambient air to the mixing unit. The ambient air metering unit in particular comprises at least one control element, for example at least one throttle element and/or at least one variable compressor, by means of which a flow rate may be increased and/or reduced. In this way, the supply of ambient air may advantageously be regulated, whereby in particular an oxidation process within the oxidation unit may advantageously be controlled.

In a further preferred configuration of the invention it is proposed that the oxidation unit be arranged flow-wise in parallel with the desulfurization unit and the reformer unit. The desulfurization unit and the reformer unit are preferably connected together flow-wise in series, wherein the desulfurization unit is arranged flow-wise upstream of the oxidation unit. In this way, a fuel gas, in particular hydrogen, for operating the fuel cell unit may be obtained advantageously simply in particular during a starting procedure of the fuel cell device.

The desulfurization unit advantageously takes the form of a hydrodesulfurization unit. A "hydrodesulfurization unit" should be understood in this context in particular to mean a desulfurization unit which is provided to desulfurize the natural gas with the addition of hydrogen to below a predetermined limit value and preferably at least largely. In particular, in this case sulfur components of the natural gas react with the hydrogen in a first process step to yield hydrogen sulfide and sulfur-free hydrocarbons. In a second process step the hydrogen sulfide may be bound in a solid sulfide compound in particular by absorption, for example in a zinc oxide bed. In this way, an advantageously long service life may be achieved for the desulfurization unit. In addition, advantageously effective desulfurization of the natural gas may be achieved.

It is moreover proposed that the desulfurization unit, the oxidation unit and the reformer unit be connected permanently together by means of at least one fluid line. Connecting the desulfurization unit, the oxidation unit and the reformer unit "permanently" together should be understood in this context in particular to mean that at least one fluid line connecting the desulfurization unit, the oxidation unit and the reformer unit has no connecting components that can be undone non-destructively and/or without using a tool, in particular without using a special tool. In particular, the at least one fluid line may merely comprise welded and/or hard solder joints. This makes it possible to achieve an advantageously reliable and/or durable gas-tightness.

It is furthermore proposed that the fuel cell device comprise thermal insulation, which surrounds the desulfurization unit and/or the oxidation unit and/or the reformer unit, in particular for the most part. "Thermal insulation" should be understood in this context in particular to mean a thermally insulating element which is provided to reduce emission from the fuel cell device of thermal energy released in particular by exothermic processes within the fuel cell device, in particular at least for the most part, and/or at least largely to prevent such emission. The phrase "at least for the most part" should here be understood to mean to an extent of at least 60%, advantageously at least 70%, preferably at least 80% and particularly preferably at least 90%. In this way, advantageously high thermal integration of the fuel cell device may be achieved. In particular, thermal energy arising though exothermic processes, in particular through partial oxidation, may advantageously be provided for endothermic processes, in particular for steam reforming, within the fuel cell device.

It is moreover proposed that the fuel cell device have a housing unit which at least substantially surrounds the desulfurization unit and/or the oxidation unit and/or the reformer unit. A "housing unit" should be understood in this context in particular to mean a structural unit which at least partially and preferably at least for the most part covers the desulfurization unit, the oxidation unit and the reformer unit when assembled relative to the surrounding environment and which may in particular comprise a plurality of components. The housing unit "at least substantially surrounding" the desulfurization unit, the oxidation unit and the reformer unit should in particular be understood to mean that the housing unit, when assembled, surrounds a spatial region and a total area of all the openings in an outer wall of the housing unit amounts in particular to a maximum of 40%, in particular at most 30%, preferably a maximum of 20% and particularly advantageously at most 10% of a total area of the outer wall of the housing unit in particular disregarding openings. In this way, the desulfurization unit, the oxidation unit and the reformer unit and/or further components of the fuel cell device are advantageously protected in particular against mechanical damage and/or soiling. Furthermore, assembly and/or transport of the fuel cell device may advantageously be simplified.

The fuel cell device according to the invention is not here intended to be restricted to the above-described application and embodiment. In particular, to put into effect a mode of operation described herein the fuel cell device according to the invention may comprise a number of individual elements, components and units which differs from the number stated herein.

BRIEF DESCRIPTION OF THE DRAWINGS

Further advantages are revealed by the following description of the drawings. The drawings show two exemplary embodiments of the invention. The drawings, description and claims contain numerous features in combination. A person skilled in the art will expediently also consider the features individually and combine them into meaningful further combinations.

In the figures:

FIG. 2 is a schematic representation of an alternative fuel cell device with a fuel cell unit, an anode gas processor, in which an oxidation unit is connected in parallel with a desulfurization unit and a reformer unit, and a recirculation unit.

DETAILED DESCRIPTION

Figure 1:
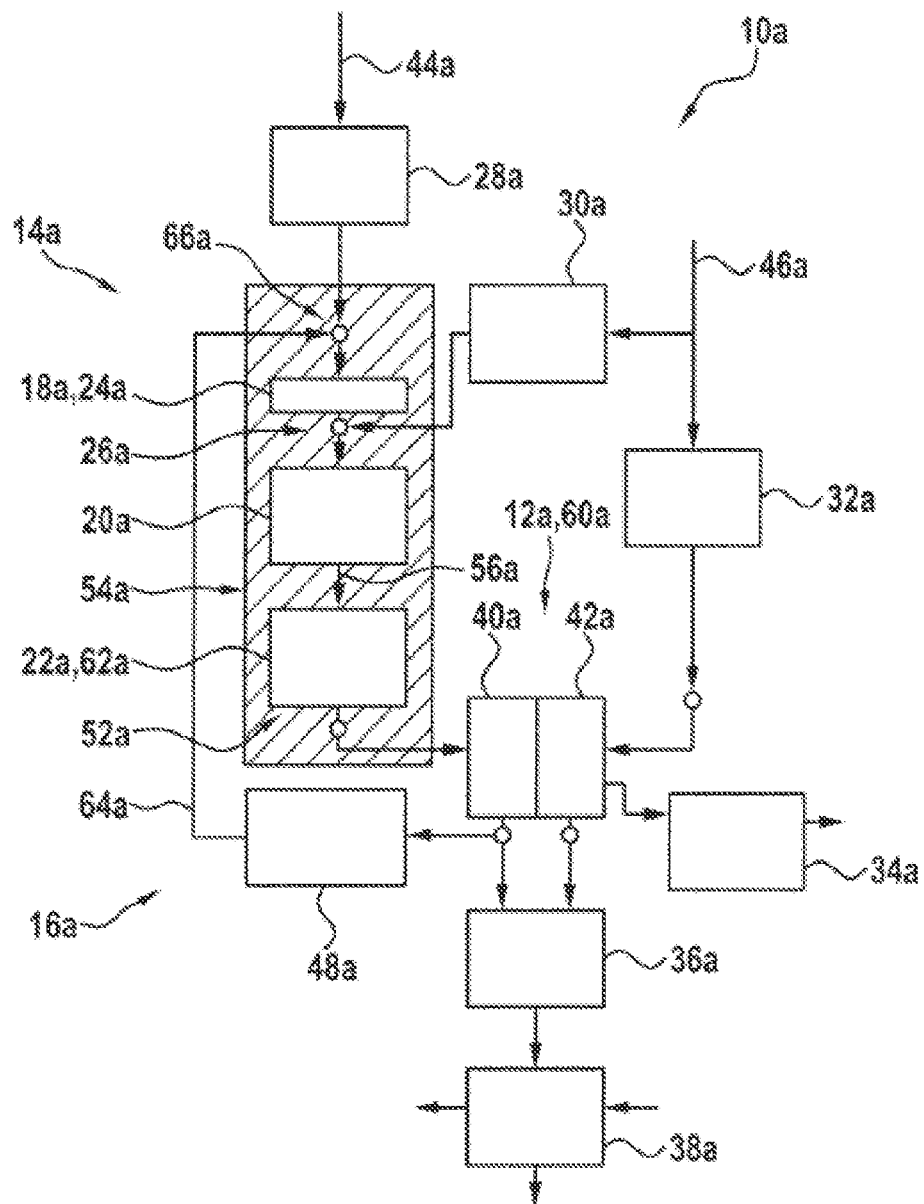
FIG. 1 is a schematic representation of a fuel cell device with a fuel cell unit, an anode gas processor comprising a desulfurization unit, an oxidation unit and a reformer unit interconnected in series, and a recirculation unit

FIG. 1 is a schematic representation of a fuel cell device 10a with a fuel cell unit 12a and an anode gas processor 14a, which latter comprises a desulfurization unit 18a, an oxidation unit 20a and a reformer unit 22a. The fuel cell unit 12a is here shown simply as a fuel cell 60a for generating electrical energy. Alternatively, however, a configuration of a fuel cell unit as a fuel cell stack with a plurality of fuel cells is also conceivable. The fuel cell 60a preferably takes the form of a solid oxide fuel cell. The fuel cell 60a comprises an anode 40a and a cathode 42a. The anode gas processor 14a is provided to prepare a natural gas for use in the fuel cell 60a. The anode gas processor 14a is arranged upstream of the anode 40a of the fuel cell 60a.

The anode gas processor 14a comprises a housing unit 54a, which surrounds the desulfurization unit 18a, the oxidation unit 20a and the reformer unit 22a preferably completely, with the exception of passages for fluid lines. In addition to the housing unit 54a, the anode gas processor 14a comprises thermal insulation 52a, which is provided to prevent thermal energy from escaping from the anode gas processor 14a. To this end, the thermal insulation 52a surrounds the desulfurization unit 18a, the oxidation unit 20a and the reformer unit 22apreferably completely. The thermal insulation 52a is preferably arranged within the housing unit 54a. Further components of the anode gas processor 14a that are not shown, in particular heat exchangers, may likewise be surrounded by the housing unit 54a and/or the thermal insulation 52a.

The desulfurization unit 18a, the oxidation unit 20a and the reformer unit 22a are connected together flow-wise in series within the anode gas processor 14a. The desulfurization unit 18a is here arranged flow-wise upstream of the oxidation unit 20a, while the reformer unit 22a is arranged flow-wise downstream of the oxidation unit 20a. The desulfurization unit 18a, the oxidation unit 20a and the reformer unit 22a are connected together permanently by means of a fluid line 56a, whereby reliable and/or durable gas-tightness is achieved within the fuel cell device 10a. Alternatively, a desulfurization unit, an oxidation unit and a reformer unit in an anode gas processor may however also be connected together via non-permanent fluid connections.

The fuel cell device 10a comprises a natural gas feed line 44a and an ambient air feed line 46a. Due to the structure of the anode gas processor 14a it is possible to dispense with further feed lines. Fresh natural gas is supplied to the fuel cell device 10a via the natural gas feed line 44a. The inflow of natural gas into the fuel cell device 10a is in this case regulated by means of a natural gas metering unit 28a. The natural gas is firstly supplied to the anode gas processor 14a. On its input side the anode gas processor 14a comprises a mixing unit 66a, in which the natural gas is mixed with a recirculated anode waste gas from the fuel cell unit 12a.

In the anode gas processor 14a the natural gas/anode waste gas mixture is firstly supplied to the desulfurization unit 18a. The desulfurization unit 18a is provided to remove sulfur compounds from the supplied natural gas, in order to prevent damage to the fuel cell unit 12a and/or to the reformer unit 22a. The desulfurization unit 18a takes the form of a hydrodesulfurization unit 24a. In the desulfurization unit 18a desulfurization of the natural gas takes place in two process steps. In a first process step sulfur components of the natural gas react with hydrogen to yield hydrogen sulfide and sulfur-free hydrocarbons. In a second process step the hydrogen sulfide is removed from the natural gas by absorption, for example in a zinc oxide bed. A further mixing unit 26a is arranged downstream of the desulfurization unit 18a. The further mixing unit 26a is provided to admix ambient air with the desulfurized natural gas conveyed out of the desulfurization unit 18a. The ambient air is supplied to the further mixing unit 26a via the ambient air feed line 46a. A first ambient air metering unit 30a is provided to regulate the inflow of ambient air into the mixing unit 26a. Ambient air is here supplied to the further mixing unit 26a in particular only during a starting procedure of the fuel cell device 10a. A further ambient air metering unit 32a is provided to regulate the inflow of ambient air to the cathode 42a of the fuel cell 60a.

The further mixing unit 26a is arranged downstream of the oxidation unit 20a. The oxidation unit 20a is provided to convert the natural gas in part into hydrogen by means of partial oxidation with the addition of oxygen from the ambient air. The reformer unit 22a arranged downstream of the oxidation unit 20a takes the form of a steam reformer unit 62a. The reformer unit 22a is provided to split long chain hydrocarbons by means of steam reforming with the addition of steam into methane, hydrogen, carbon monoxide and carbon dioxide. The reformate obtained in this way is supplied to the anode 40 of the fuel cell unit 12a. Thermal energy required for the steam reforming may in particular be transferred via heat exchangers not shown here.

In particular during a starting procedure of the fuel cell device 10a, too small a proportion of steam is available for operation of the reformer unit 22a and/or too small a proportion of hydrogen is available for operation of the hydrodesulfurization unit 24a and the fuel cell unit 12a. The oxidation unit 20a makes it possible, in particular during the starting procedure of the fuel cell device 10a, to obtain hydrogen using atmospheric oxygen from the ambient air. The hydrogen obtained in this way is used for start-up operation of the fuel cell unit 12a.

To supply the desulfurization unit 18a with the hydrogen required for desulfurization of the natural gas and the reformer unit 22a with the water, in particular in the form of steam, required for steam reforming, the fuel cell device 10a comprises a recirculation unit 16a. The recirculation unit 16a comprises a compressor 48a and a fluid line 64a, via which a proportion of an anode waste gas from the fuel cell unit 12a is passed to the mixing unit 66a of the anode gas processor 14a and there mixed with freshly supplied natural gas. The anode waste gas of the fuel cell unit 12a contains both fuel gas, in particular hydrogen, not reacted in the fuel cell unit 12a and water, in particular in the form of vapor, arising through a reaction at the anode 40a of the fuel cell unit 12a. When the fuel cell device 10a is operating stably, hydrogen is mainly obtained within the fuel cell unit 12a by catalysis of the reformate produced in the reformer unit 22a.

FIG. 1 additionally shows a burner unit 36a arranged downstream of the fuel cell unit 12a. A proportion of the anode waste gas from the fuel cell unit 12a is supplied to the burner unit 36a. The burner unit 36a serves to burn flammable substances remaining in the anode waste gas from the fuel cell unit 12a. Thermal energy produced in the process may be made available via a heat exchanger 38a. Oxygen required for operation of the burner unit 36a is supplied to the burner unit 36a in the form of a cathode waste gas. Furthermore, the fuel cell device 10a comprises an inverter 34a, which transforms a DC voltage generated by the fuel cell unit 12a into an AC voltage.

FIG. 2 shows a further exemplary embodiment of the invention. The following descriptions and the drawings are restricted substantially to the differences between the exemplary embodiments, wherein with regard to identically designated components, in particular in relation to components with identical reference signs, reference may also be made in principle to the drawings and/or the description of the other exemplary embodiment, in particular of FIG. 1. To distinguish the exemplary embodiments the letter a is placed after the reference signs of the exemplary embodiment of FIG. 1. In the exemplary embodiment of FIG. 2 the letter a is replaced by the letter b.

FIG. 2 shows an alternative configuration of a fuel cell device 10b. The fuel cell device 10b comprises an anode gas processor 14b comprising a desulfurization unit 18b, a reformer unit 22b and an oxidation unit 20b. The oxidation unit 20b is arranged in parallel with the desulfurization unit 18b and the reformer unit 22b, which are connected together flow-wise in series. The oxidation unit 20b is operated only during a starting procedure of the fuel cell device 10b. During the starting procedure of the fuel cell device 10b, the oxidation unit 20b is supplied with a natural gas/ambient air mixture via a natural gas and ambient air metering unit 68b. By means of partial oxidation the natural gas/ambient air mixture is converted at least in part into hydrogen. The hydrogen obtained in this way is used for start-up operation of the fuel cell unit 12b, whereas when the fuel cell device 10b is operating stably hydrogen is mainly obtained within the fuel cell unit 12b by catalysis of a reformate produced in the reformer unit 22b.

What is claimed is:

1. A fuel cell device configured to be operated with a natural gas, having a fuel cell unit (12) and an anode gas processor (14) arranged upstream of the fuel cell unit (12), which anode gas processor is configured to prepare the natural gas for use in the fuel cell unit (12) and which comprises a desulfurization unit (18), which is configured to desulfurize the natural gas, an oxidation unit (20), which is configured to perform partial oxidation, and a reformer unit (22), which is configured to produce at least one fuel gas, characterized by a recirculation unit (16), which is configured to supply at least a proportion of an anode waste gas from the fuel cell unit (12) to the anode gas processor (14), wherein the anode waste gas is delivered to the anode gas processor upstream of the desulfurization unit (18), and wherein the anode waste gas supplied by the recirculation unit (16) comprises steam and hydrogen.

2. The fuel cell device according to claim 1, characterized in that the desulfurization unit (18), the oxidation unit (20) and the reformer unit (22) are connected together flow-wise in series.

3. The fuel cell device according to claim 2, characterized in that the desulfurization unit (18) is arranged flow-wise upstream of the oxidation unit (20) and the reformer unit (22) is arranged flow-wise downstream of the oxidation unit (20).

4. The fuel cell device according to claim 1, characterized in that the anode gas processor (14) comprises a mixing unit (26) which is configured to mix a fluid leaving the desulfurization unit (18) with ambient air.

5. The fuel cell system according to claim 4, characterized by an ambient air metering unit (30), which is configured to regulate a supply of ambient air to the mixing unit (26).

6. The fuel cell device at least according to claim 1, characterized in that the oxidation unit (20) is arranged flow-wise in parallel with the desulfurization unit (18) and the reformer unit (22).

7. The fuel cell device according to claim 1, characterized in that the desulfurization unit (18) takes a form of a hydrodesulfurization unit (24).

8. The fuel cell device according to claim 1, characterized in that at least two of the desulfurization unit (18), the oxidation unit (20) and the reformer unit (22) are connected permanently together by means of at least one fluid line (56).

9. The fuel cell device according to claim 1, characterized by thermal insulation (52), which at least substantially surrounds at least one of the desulfurization unit (18), the oxidation unit (20) and the reformer unit (22).

10. The fuel cell device according to claim 1, characterized by a housing unit (54), which at least substantially surrounds at least one of the desulfurization unit (18), the oxidation unit (20) and the reformer unit (22).

11. The fuel cell device according to claim 8, characterized in that at least two of the desulfurization unit (18), the oxidation unit (20) and the reformer unit (22) are connected permanently together by means of at least one fluid line (56).

12. The fuel cell device according to claim 9, wherein the thermal insulation (52) at least substantially surrounds at least two of the desulfurization unit (18), the oxidation unit (20) and the reformer unit (22).

13. The fuel cell device according to claim 10, wherein the housing unit (54) at least substantially surrounds at least two of the desulfurization unit (18), the oxidation unit (20) and the reformer unit (22).

14. The fuel cell device according to claim 8, characterized in that the desulfurization unit (18), the oxidation unit (20) and the reformer unit (22) are connected permanently together by means of at least one fluid line (56).

15. The fuel cell device according to claim 9, wherein the thermal insulation (52) at least substantially surrounds the desulfurization unit (18), the oxidation unit (20) and the reformer unit (22).

16. The fuel cell device according to claim 10, wherein the housing unit (54) at least substantially surrounds the desulfurization unit (18), the oxidation unit (20) and the reformer unit (22).

17. The fuel cell device according to claim 1, wherein the anode waste gas is delivered downstream of a natural gas metering unit (28a).

* * * * *